March 19, 1935. S. E. MORRAL ET AL 1,995,074
BUTT REMOVING DEVICE FOR GREEN CORN
Original Filed April 27, 1926  2 Sheets-Sheet 1
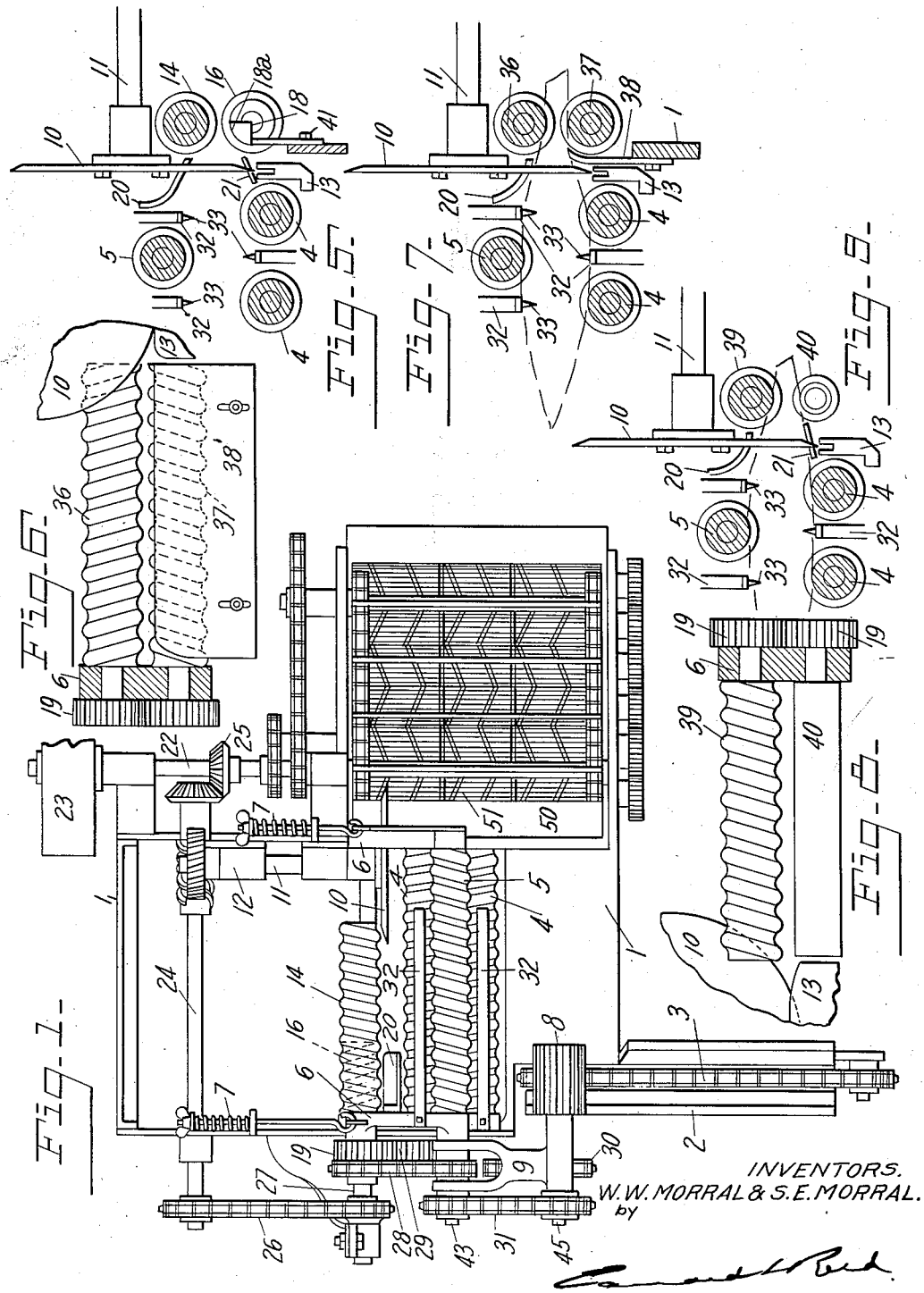
INVENTORS.
W. W. MORRAL & S. E. MORRAL.
by
their ATTORNEY.

March 19, 1935.  S. E. MORRAL ET AL  1,995,074
BUTT REMOVING DEVICE FOR GREEN CORN
Original Filed April 27, 1926   2 Sheets-Sheet 2
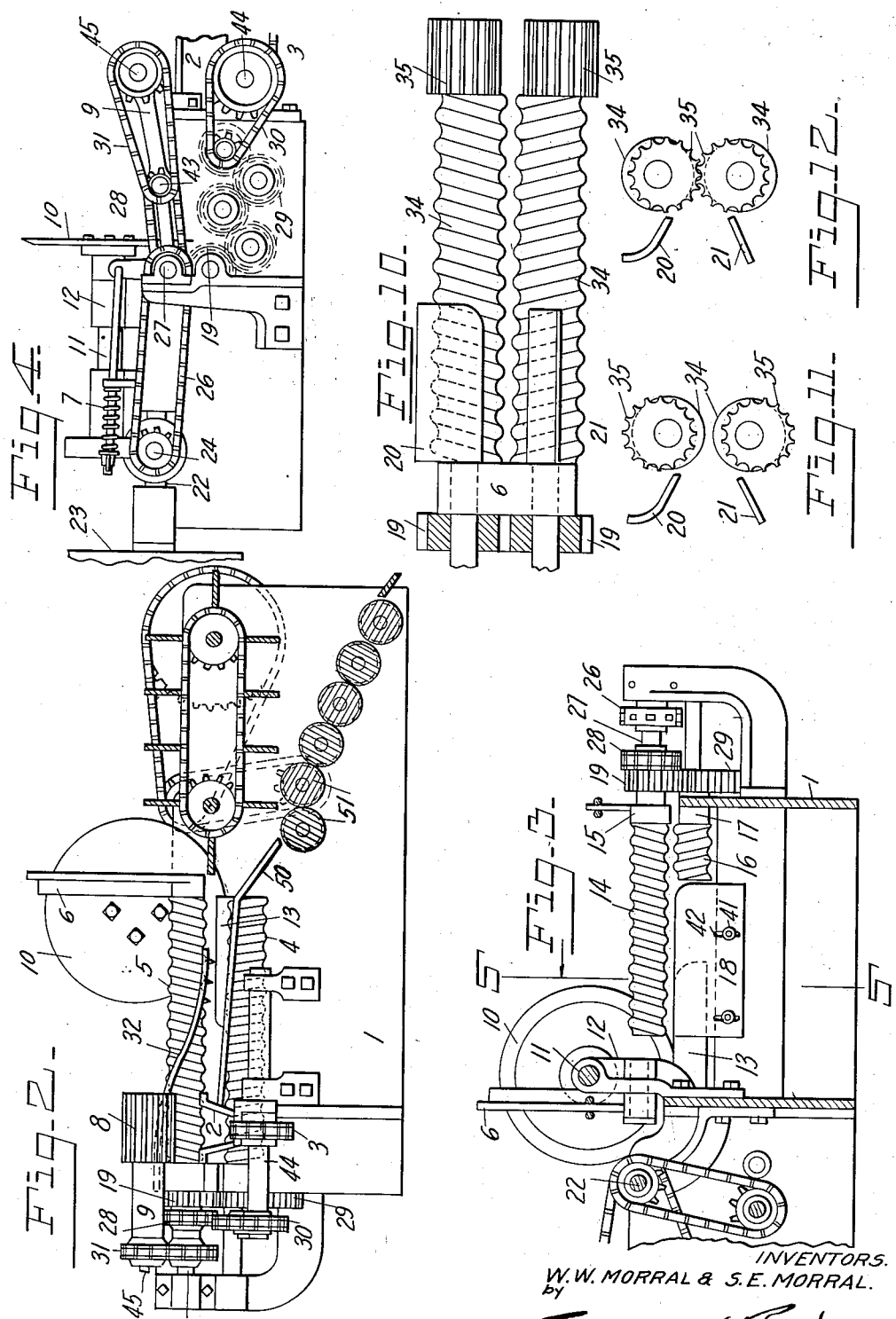
INVENTORS.
W. W. MORRAL & S. E. MORRAL.
by
their ATTORNEY.

Patented Mar. 19, 1935

1,995,074

UNITED STATES PATENT OFFICE 1,995,074

BUTT REMOVING DEVICE FOR GREEN CORN

Samuel E. Morral and William W. Morral, Morral, Ohio

Original application April 27, 1926, Serial No. 104,969. Patented November 22, 1932, No. 1,888,466. Divided and this application November 7, 1932, Serial No. 641,548

15 Claims. (Cl. 146—84)

This invention relates to a mechanism for removing the butts from ears of corn to facilitate the removal of the husks therefrom and the present application is a division of the application filed by us April 27, 1926, Serial No. 104,969.

One object of the invention is to provide such a machine with improved means for controlling the position of the ears of corn with relation to the butt removing device.

A further object of the invention is to provide such a machine with a gaging device having means for advancing the butt of the ear and for limiting the movement of the ear toward the gaging device.

A further object of the invention is to provide such a machine with means for causing the butts of the ears to properly engage the gaging device.

A further object of the invention is to provide such a machine having spiral gaging rollers and spiral feeding rollers and means to control the movement of the ear by said rollers.

A further object of the invention is to provide such a machine having spiral gaging rollers and spiral feeding rollers and having husk loosening devices so arranged with relation to said rollers that they will efficiently loosen the husks as the ears are advanced by said rollers.

Other objects of the invention will appear as the mechanism is described in detail.

In the accompanying drawings Fig. 1 is a plan view of a butt removing mechanism embodying our invention, showing the same in connection with husking mechanism; Fig. 2 is a side elevation of the machine of Fig. 1, showing the husking mechanism in section; Fig. 3 is an elevation of that side of the machine opposite Fig. 2, with the husking mechanism broken away; Fig. 4 is a front elevation of the machine, partly broken away; Fig. 5 is a transverse sectional view taken on the line 5—5 of Fig. 3, looking in the direction of the arrows; Fig. 6 is a side elevation of a modified form of gaging device; Fig. 7 is a transverse sectional view taken through the gaging device of Fig. 7; Fig. 8 is a side elevation of another form of gaging device; Fig. 9 is a transverse sectional view taken through the gaging device of Fig. 8; Fig. 10 is a side elevation of a modified form of butt removing device; Fig. 11 is an end elevation of such a butt removing device, showing the snapping rollers separated; and Fig. 12 is a similar view showing the snapping rolls in proximity one to the other.

In these drawings we have illustrated one embodiment of our invention and have shown the same as comprising a main frame 1 provided at its forward end, that is the end at which the ears of corn are placed thereon, with a conveyor which feeds the ears of corn butt foremost to a feeding mechanism. This feeding mechanism moves the ear into contact with a gaging device and then moves the ear transversely to its length to the butt removing device and, after the butt has been removed, delivers the ear to the husking mechanism. In the present arrangement the delivery conveyor comprises a trough 2 extending transversely to the length of the machine and projecting beyond one side thereof. This trough is provided with an endless belt conveyor 3, the upper stretch of which forms the bottom of the trough and moves the ears toward the feeding mechanism. The feeding mechanism as here shown is substantially similar to that shown and described in reissue Patent No. 13,207 granted to us February 14, 1911 and comprises a plurality of spiral rollers arranged to engage the several ears successively and to move them both in the direction of their length and transversely to their length. In the present arrangement, there are two lower rollers 4 spaced a short distance apart and having their axes substantially parallel and arranged in substantially the same horizontal plane. An upper spiral roller 5 is arranged above the rollers 4 with its axis in a vertical plane extending between the lower rollers 4. The spirals in these feeding rollers are so arranged that an ear of corn placed on the delivery conveyor 3 butt foremost will be caused to enter the space between the rollers 4 and 5 and to be engaged by the spirals on those rollers. The upper roller 5 is movable with relation to the lower rollers to accommodate the same to ears of various sizes. As here shown, this roller is carried by arms 6 pivotally mounted on the main frame of the machine. The arms 6 are acted upon by springs 7 which tend to counterbalance the weight of the roller 5 and of the arms and to prevent the roller from exerting too great a pressure on the ears of corn, it being understood that these machines are used primarily for husking green corn and it is undesirable that the grains should be bruised. To insure the proper entrance of the butt of the ear between the feeding rollers we have arranged above the conveyor trough 2, near the discharge end thereof, a corrugated roller 8 which is carried by a pivoted arm 9 so that it may rise and fall to accommodate itself to ears of different sizes, and when this roller rests upon an ear of corn the ear will be gripped between the same and the belt 3 and will be thrust between the feeding rollers.

Arranged at one side of the feeding rollers and near the discharge ends thereof is a butt removing device which, in those forms of the mechanism shown in Figs. 1 to 10, comprises a rotary cutter 10 mounted on a shaft 11 journaled in bearings 12 carried by the main frame. Cooperating with this cutter is a cutter bar 13 which is rigidly mounted on the main frame and arranged to support the butt of the ear during the cutting operation. Arranged on the outer side of the butt removing device and extending lengthwise of the feeding rollers is a gaging device which engages the butt of the ear to properly position the same with relation to the butt removing device. This gaging device may take various forms but it usually comprises two members spaced apart to receive the stem of the ear between them and preferably at least one of the members of this gaging device is in the form of a spiral roller which will act upon the butt of the ear and advance the butt at the same speed that the body of the ear is being advanced by the feeding rollers, thus presenting the ear to the butt removing cutter in the proper position and preventing the same from twisting during the cutting operation and thus binding on the cutter.

When the gaging device consists merely of two full length spiral rollers, as shown in the above mentioned patent, the friction between the rollers and the stem of the ear is such that before the ear reaches the cutter it will sometimes be drawn between the rollers so far that the cutter will sever too large a portion of the ear, thus removing a part of the grain. The friction will also generate an objectionable amount of heat. To avoid these undesirable features we have herein illustrated certain forms of gaging device which prevent excessive friction between the ears and the members of the gaging device and limit the distance which the stem of the ear can be drawn between the gaging members. In that form of the device shown in Figs. 3 and 5 the upper member comprises a full length spiral roller 14 journaled at its forward end in a bearing 15. Arranged beneath the forward portion of the roller 14 and substantially parallel therewith is a short spiral roller 16 journaled in a bearing 17, and extending substantially in line with the short roller 16 is a fixed gaging bar 18 having a curved contact surface 18a arranged to have supporting engagement with the butt of the ear. The end of the fixed gaging bar is arranged close to the end of the short roller 16 so that the butt of the ear will pass readily from the roller to the bar, and the gaging bar is preferably mounted for vertical adjustment to accommodate it to ears of different sizes. As here shown, it is secured to the main frame by screws 41 extending through slots 42 in the gaging bar. The rollers are connected by intermeshing gears 19 so that they will be rotated in opposite directions and the two spiral rollers serve to impart initial movement to the butt of the ear and after the ear is in motion transversely to its length the butt will move into contact with the fixed bar 18 and will move along the same into contact with the cutter. When an ear of corn is thrust between the feeding rollers, by the delivery devices 3 and 8, it will be gripped between the upper and lower feeding rolls and moved in the direction of its length until it comes in contact with the gaging devices. If desired, converging guide plates 20 and 21 may be arranged in front of the gaging rollers to guide the butt of the ear into the space between those rollers. The ear will begin to move transversely to its length as soon as its movement in the direction of its length has been checked by its contact with the gaging rollers and it will continue to move transversely to its length until it has been carried to and past the butt removing device.

The feeding and gaging rollers may be driven in any suitable manner. In the present mechanism, a main drive shaft 22, extending transversely to the machine, is provided with a belt pulley 23 or other means for connecting it with a source of power. A longitudinal shaft 24 extends forwardly from the shaft 22 and is connected with that shaft by beveled gears 25. A sprocket chain 26 connects the forward end of the shaft 24 with a shaft 27 which carries the upper gaging roller 14. This shaft 27 is connected by a sprocket chain 28 with the shaft 43 of the upper feed roller 5. A train of gearing 29 extending from the lower gear 19 operates the two lower feed rollers. A sprocket chain 30 connects the shaft of one of the rollers 4 with the driving shaft 44 of the delivery conveyor, and a sprocket chain 31 connects the shaft of the upper feed roller with the shaft 45 of the pressure roller 8 of the delivery mechanism.

If desired, means may be associated with the feeding mechanism for loosening the husks to enable the same to be more readily grasped by the husking rollers and, in the present device, we have provided a plurality of husk loosening devices, each consisting of a resilient bar 32 mounted on a suitable support at its forward end and having at its rear or free end a series of spurs or teeth 33 which will bite into the husk and tear or otherwise loosen the same. As here shown, one of these husk loosening bars is arranged between the two lower feeding rollers 4 and two of these husk loosening bars are arranged on the respective sides of the upper feeding rollers 5. These latter bars are mounted on the forward arm 6, which supports the upper feed roller, so that they will rise and fall with that roller and will thus be positioned according to the size of the ear.

As has been stated, the butt removing mechanism may take various forms and in Figs. 10, 11 and 12, we have shown a modified form of butt removing device in which the butt is broken from the body of the ear by means of snapping rollers. As here shown, the gaging device comprises two spiral rollers 34 and rigidly secured to the end of each of these gaging rollers is a short snapping roller 35. These snapping rollers are eccentrically arranged with relation to the axes of the gaging rollers and are so arranged that the stem of the ear will move between them while they are in their separated positions and the further rotation of the rollers will cause the same to engage the stem or butt of the ear and break the same from the ear.

In Figs. 6 and 7 we have shown a gaging device comprising two spiral rollers 36 and 37 which are mounted in the same positions and operate in the same manner as the gaging rollers 14 and 16 with the exception that the lower spiral roller 37 extends for the full length of the upper spiral roller 36. A guard plate 38 is mounted on a fixed part of the frame and extends upwardly on the inner side of the lower gaging roller 37 and terminates approximately in the horizontal plane of the upper portion of the body of that roller, as shown in Fig. 7. This plate has its upper edge slightly bent outwardly, toward the gaging roller, and arranged to be engaged by the butt of the ear while the stem passes above the same, and thus limits the outward movement of the ear and prevents the same from being drawn too far between the gaging rollers.

In Figs. 8 and 9 we have shown a gaging device comprising an upper spiral roller 39 and a smooth cylindrical lower roller 40, these rollers being mounted and driven in the manner above described. The smooth roller when used in connection with the spiral roller does not have the same tendency to draw the ear between the two rollers as does a gaging device consisting of two spiral rollers and the rotatory movement of the smooth roller facilitates the feeding of the butt end of the ear by the spiral roller.

After the butts have been removed from the ears the debutted ears may be delivered by the feeding rollers to a husking mechanism or any other desired point of discharge. As here shown, the ears are delivered onto a chute 50 which in turn delivers them to husking rollers 51 which are constructed and arranged as set forth in the above mentioned application for patent.

While we have shown and described one embodiment of our invention, together with certain modifications thereof, we wish it to be understood that we do not desire to be limited to the details thereof as various modifications may occur to a person skilled in the art.

Having now fully described our invention, what we claim as new and desire to secure by Letters Patent, is:

1. In a machine of the character described, a butt removing device, gaging rolls arranged in advance of said butt removing device to position an ear of corn with relation thereto, spiral feeding rollers extending parallel with said gaging device to engage an ear of corn and move the same into engagement with said gaging rolls and along said gaging rolls to said butt removing device, and converging plates interposed between said feeding rollers and said gaging rolls to guide the ear into proper contact with said gaging rolls, said plates having their adjacent edges spaced apart a distance greater than the distance between said gaging rolls to permit the end of the ear of corn to pass between the same and engage said gaging rollers.

2. In a machine of the character described, a butt removing device, a gaging device arranged in advance of said butt removing device, and comprising members spaced apart to receive the stem of an ear of corn between them; means to move an ear of corn into engagement with said gaging device and to move the same lengthwise thereof into engagement with said butt removing device, and converging plates interposed between said gaging device and the means for moving said ear of corn into contact with said gaging device for the purpose of guiding the ear into proper engagement with said gaging device, said plates having their adjacent edges spaced apart a distance greater than the distance between the members of said gaging device to permit the end of the ear of corn to pass between the same and engage said gaging members.

3. In a machine of the character described, a butt removing device, means for moving an ear of corn both in the direction of its length and transversely to its length, a gaging device to position said ear of corn with relation to said butt removing device and comprising two spiral gaging rollers, one of said gaging rollers being of less length than the other gaging roller, and a guide bar arranged substantially in line with the shorter gaging roller.

4. In a machine of the character described, a butt removing device, spiral feed rollers to receive an ear of corn and move the same both in the direction of its length and transversely to its length toward said butt removing device, a gaging device to position said ear of corn with relation to said butt removing device and comprising a spiral gaging roller, a second spiral gaging roller arranged parallel with and spaced from the first mentioned spiral gaging roller and of less length than the first mentioned spiral gaging roller, and a guide bar arranged in line with the last mentioned spiral gaging roller.

5. In a machine of the character described, a butt removing device, a feeding device to receive an ear of corn and move the same both in the direction of its length and transversely to its length toward said butt removing device, a gaging device to position said ear of corn with relation to said butt removing device and comprising a spiral gaging roller, a second spiral gaging roller arranged parallel with and spaced from the first mentioned spiral gaging roller and of less length than the first mentioned spiral gaging roller, and a fixed guide bar having a curved contact surface arranged substantially in line with the last mentioned spiral gaging roller.

6. In a machine of the character described, a butt removing device, a feeding device to receive an ear of corn and move the same both in the direction of its length and transversely to its length toward said butt removing device, a gaging device to position said ear of corn with relation to said butt removing device and comprising a spiral gaging roller, a second spiral gaging roller arranged parallel with and spaced from the first mentioned spiral gaging roller and of less length than the first mentioned spiral gaging roller, a normally stationary guide bar arranged beyond the last mentioned gaging roller and having a contact surface to receive the butt of an ear of corn as it passes from said last mentioned gaging roller, and means for adjusting said guide bar with relation to said last mentioned gaging roller.

7. In a machine of the character described, a butt removing device, a feeding device to move an ear of corn in the direction of its length and transversely to its length toward said butt removing device, a gaging device to position said ear with relation to said butt removing device, said gaging device comprising upper and lower rollers rotatably mounted at those ends thereof which are remote from said butt removing device, one of said rollers having a spiral rib and the other of said rollers having a smooth surface.

8. In a machine of the character described, the combination with a butt removing device, a gaging device to position an ear of corn with relation to said butt removing device, and spiral feeding rollers arranged to receive said ear of corn between them, to move the end thereof into engagement with said gaging device and to move said ear transversely to its length to said butt removing device, of a resilient bar extending lengthwise of said spiral rollers between one of said rollers and said gaging device and having spurs arranged to engage the husk of the ear as it is advanced by said rollers and loosen the husk.

9. In a machine of the character described, the combination with a butt removing device, a gaging device to position an ear of corn with relation to said butt removing device, upper and lower spiral feeding rollers arranged to receive an ear of corn between them, to move the end thereof into engagement with said gaging device and to move the ear transversely to its length to said butt removing device, and a pivoted arm supporting one end of the upper spiral roller, of a resilient bar mounted at one end on said pivoted arm for movement therewith, extending lengthwise of said feeding rollers and having near its free end teeth to engage and loosen the husks on an ear of corn as the latter is advanced by said feeding rollers.

10. In a machine of the character described, the combination with a butt removing device, a gaging device to position an ear of corn with relation to said butt removing device, upper and lower spiral feeding rollers arranged to receive an ear of corn between them, to move the end thereof into engagement with said gaging device and to move the ear transversely to its length to said butt removing device, and a pivoted arm supporting one end of the upper spiral roller, of resilient bars secured to said arm, extending lengthwise of said upper roller on the respective sides thereof and having teeth to engage the husk of an ear of corn and loosen the same.

11. In a machine of the character described, the combination with a butt removing device, a gaging device to position an ear of corn with relation to said butt removing device, a pair of spiral rollers extending lengthwise of said gaging device, an upper spiral roller arranged above said pair of spiral rollers and having its axis in a vertical plane extending between the rollers of said pair, of a resilient bar arranged between the rollers of said pair and having upwardly extending teeth, and a pair of resilient bars arranged on the opposite sides of said upper spiral roller, extending lengthwise thereof and having downwardly projecting teeth, the teeth on said bars being arranged to engage the husk of an ear of corn and loosen the same.

12. In a machine of the character described, a butt removing device, a gaging device arranged in advance of said butt removing device to engage the butt end of an ear of corn and position the same with relation to said butt removing device, said gaging device comprising a spiral roller to move the butt end of the ear toward said butt removing device, means to move an ear of corn in the direction of its length into engagement with said gaging device and to move said ear transversely to its length toward said butt removing device, and converging plates arranged between said means and said gaging device to guide the butt end of the ear into proper engagement with said gaging device, said plates having their adjacent edges spaced apart a distance sufficient to permit the end of the ear of corn to pass between the same and to engage said gaging device.

13. In a machine of the character described, a butt removing device, means for moving an ear of corn both in the direction of its length and transversely to its length, a gaging device to position said ear of corn with relation to said butt removing device, said gaging device comprising a spiral roller to advance the butt end of the ear toward said butt removing device, a second roller of less length than said spiral roller and cooperating therewith to draw the butt end of the ear lengthwise toward said rollers during a portion of its transverse movement, and a stationary member arranged lengthwise of said spiral roller and in line with said second roller to hold said ear against lengthwise movement during another portion of its transverse movement.

14. In a machine of the character described, a butt removing device, means for moving an ear of corn both in the direction of its length and transversely to its length, a gaging device to position said ear of corn with relation to said butt removing device, said gaging device comprising a spiral roller to advance the butt end of the ear toward said butt removing device, a second roller of less length than said spiral roller arranged beneath that end of said spiral roller which is remote from said butt removing device and cooperating with said spiral roller to draw the butt end of said ear toward said rollers during the first portion of its movement by said spiral roller, and a bar arranged beyond and in line with said second roller to receive the butt end of said ear from said second roller and to support the same and hold said ear against lengthwise movement during the final portion of its movement by said spiral roller.

15. In a machine of the character described, a butt removing device, means for moving an ear of corn both in the direction of its length and transversely to its length, a gaging device to position said ear of corn with relation to said butt removing device, said gaging device comprising a spiral roller to advance the butt end of the ear toward said butt removing device, a second roller of less length than said spiral roller and cooperating therewith to draw the butt end of the ear lengthwise toward said rollers during a portion of its transverse movement, a stationary member arranged lengthwise of said spiral roller and in line with said second roller to hold said ear against lengthwise movement during another portion of its transverse movement, and converging plates interposed between said rollers and the first mentioned ear moving means to guide the butt end of the ear toward said rollers.

SAMUEL E. MORRAL.
WILLIAM W. MORRAL.